United States Patent Office 2,848,375
Patented Aug. 19, 1958

2,848,375

REMOVAL OF BASIC NITROGEN IMPURITIES FROM HYDROCARBONS WITH BORIC ACID AND A POLYHYDROXY ORGANIC COMPOUND

John G. Gatsis, Chicago, Ill., assignor to Universal Oil Products Company, Des Plaines, Ill., a corporation of Delaware No Drawing. Application February 6, 1956
Serial No. 563,420

12 Claims. (Cl. 196—39)

This invention relates to a process for treating organic substances to remove basic impurities present therein as contaminants. More specifically, the process is concerned with a method of removing basic impurities containing nitrogen from cracked hydrocarbon fractions and particularly from cracked gasolines.

Many organic substances contain basic impurities such as nitrogen containing compounds. Particularly all petroleums contain combined nitrogen although usually in small quantities. However, certain crude petroleums possess a high nitrogen content. The structures of these nitrogen compounds are not known very clearly due to the fact that the compounds are usually decomposed during distillation and are converted largely to basic materials having the characteristics of pyridine, quinoline and other basic organic compounds. Many of these basic compounds are objectionable in cracked gasolines inasmuch as they possess disagreeable odors and some cause a development of a reddish color in the gasoline or other hydrocarbon fraction containing the same.

It has been found that the antiknock rating of straight run gasoline, natural gasoline, cracked gasoline or mixtures thereof may be greatly improved by reforming these fractions. The improvement is particularly great when these fractions are catalytically reformed, yielding a product whose antiknock characteristics are substantially higher than those which are prepared by thermal reforming. In catalytically reforming these fractions a combination of desirable reactions occur that are particularly suitable for improving the characteristics of the gasoline, said reactions including isomerization of straight chain paraffins, dehydrogenation of naphthenes to produce aromatics, selective cracking of heavy molecules to produce light molecules, etc. The desirable catalytic reforming reactions may be effected for long periods of time when the operating conditions and charge stock characteristics are such that they do not unduly deactivate the catalyst.

Likewise in order to conserve petroleum which was formerly wasted, the process of polymerizing low boiling hydrocarbons produced from a cracking product was devised. Formerly the light gases produced in a cracking process were burned to produce heat or merely to dispose of these gases. However, developments in the petroleum industry have made possible the utilization of these gases for motor fuels. Olefinic gases may be selectively polymerized to materials boiling in the gasoline range which possess good antiknock characteristics. The usual material that is polymerized is a selective fraction of the gasoline produced in the cracking unit, and containing $C_3$ and/or $C_4$ portions of the gases. When high olefinic propane and butane derivatives are contacted with a phosphoric acid catalyst a controlled polymerization reaction occurs producing a material that boils within the gasoline range. The effluent from a polymerization product is considered to be an excellent motor fuel.

It has been found, however, that the effective life of the catalysts which are used in the above mentioned polymerization and catalytic reforming operations is frequently seriously reduced by the presence of relatively small amounts of basic impurities in the feed stocks which are charged to the polymerization or catalytic reforming unit. It is, therefore, desirable to prevent detrimental basic impurities from contacting the catalyst in the operations.

It is, therefore, an object of this invention to remove basic impurities from organic substances containing the same.

Another object of this invention is to remove basic nitrogen containing impurities from hydrocarbon distillates.

One embodiment of this invention is found in a process for the removal of basic impurities from organic substances containing the same by treating said substances with an acid solution comprising boric acid and a polyhydroxy organic compound, and recovering the purified organic substances.

A specific embodiment of the invention resides in a process for the removal of nitrogen containing basic impurities from naphtha containing the same by treating said naphtha with an acid solution comprising boric acid and a polyhydroxy organic compound, and recovering the purified naphtha.

A more specific embodiment of the invention is found in a process for the removal of nitrogen containing basic impurities from naphtha containing the same by treating said naphtha with an acid solution comprising boric acid and glycerol, and recovering the purified naphtha.

Other objects and embodiments referring to alternative polyhydroxy organic compounds will be referred to in the following further detailed description of the invention.

The process of the present invention is concerned with the removal of nitrogen containing basic impurities, it having been found that these impurities may be removed from petroleum fractions and particularly cracked hydrocarbon fractions by treating said fractions with an acid solution comprising boric acid and a polyhydroxy organic compound.

The acid solution which is used to treat the organic substance is prepared by admixing boric acid and a polyhydroxy organic compound to obtain an acid solution which is higher in acidity than either of the components. The polyhydroxy organic compound has the property of transforming the relatively weak orthoboric acid to a relatively strong monobasic acid solution thereby enhancing the ability of the thus formed acid solution to purify the organic substance containing the basic nitrogen impurities. This ability of the thus formed highly acid solutions to purify organic substances containing basic nitrogen impurities is due not only to their strong acid properties but also due to the fact that they are organic in nature and thus have solvent properties for other organic substances which are greater than the solvent properties of previously utilized treating agents, for example, aqueous sulfuric acid solutions.

The polyhydroxy organic compounds which may be admixed with the boric acid to form the boric acid-organic compound solutions comprise those polyhydroxy organic compounds in which two OH groups are situated on adjacent carbon atoms to which they are bound. Such organic compounds include poly alcohols such as 1,2-dihydroxypropane (propylene glycol), glycerol, 1,2-dihydroxybutane (α-butylene glycol), 2,3-dihydroxybutane, 1,2-dihydroxypentane (α-amylene glycol), 2,3-dihydroxypentane, 1,2,3-trihydroxypentane, 2,3,4-trihydroxypentane, etc.; polyphenols such as o-dihydroxybenzene (pyrocatechin), 1,2,3-trihydroxybenzene (pyrogallol), 1,2,4-trihydroxybenzene (hydroxy-hydroquinone), etc.;

hydroxy acids such as glycolic acid, lactic acid, dihydroxy propionic acid, α-hydroxybutyric acid, α,β-dihydroxybutyric acid, α-hydroxypentanoic acid, α,β-dihydroxypentanoic acid, etc. Ketonic acids and ketonic alcohols such as pyruvic acid and diacetone alcohol which can exist in enol form are also within the scope of the definition of polyhydroxy compounds as set forth hereinabove. In enol form such compounds have hydroxyl groups on adjacent carbon atoms. It is to be understood that the abovementioned compounds are only examples of the types of polyhydroxy organic compounds which may be used in this invention, and that said invention is not necessarily limited thereto. The ratio of the polyhydroxy organic compounds to the boric acid in the solution formed by the addition will be in the range of from about 1:1 to about 5:1.

Organic substances containing basic nitrogen impurities which may be treated by the acid solution to remove said impurities include petroleum distillates such as straight run gasoline, thermally cracked gasoline, catalytically cracked gasoline, straight run naphtha, thermally cracked naphtha, catalytically cracked naphtha, straight run kerosene, thermally cracked kerosene, catalytically cracked kerosene, diesel fuels, light fuel oils, and cycle stock for catalytic cracking operations. Low molecular weight normally gaseous paraffins (in liquid form) may in some instances be treated by the process of this invention.

The process of this invention may be effected in any suitable manner and may comprise either a batch or a continuous type operation. When a batch type operation is used, a quantity of the organic substances containing the basic nitrogen impurity, is placed in an appropriate apparatus which may be equipped with stirring or other agitating means. The boric acid-polyhydroxy organic compound solution is added to the organic substance and the mixture is thoroughly agitated for a predetermined period of time. If the organic substance containing the impurities is normally in liquid form the extraction will proceed at atmospheric pressure and room temperature. However, if the organic substance is normally in gaseous form the extraction will take place at a superatmospheric pressure sufficient enough to maintain said normally gaseous organic substance in a liquid phase, said pressures being in the range of from about 2 to about 100 atmospheres. At the end of this time the organic substance is separated from the acid solution by conventional means which may include mechanical separation or flashing off the treated organic substance and recovering the same.

Another method of effecting the process of the present invention is a continuous type operation. In this operation the organic substance containing a basic nitrogen impurity is continuously charged to an extraction apparatus maintained at the proper operating conditions of temperature and pressure. The boric acid-polyhydroxy organic compound solution is also continuously charged to the extractor through separate means. It is contemplated within the scope of this invention that the boric acid and polyhydroxy compound may be admixed prior to entry into the reactor and charged thereto in a single stream or, if so desired, the boric acid and polyhydroxy organic compound may be charged to said extractor through separate streams and the solution hereinbefore described is then formed in situ. The organic compound is continuously withdrawn from the extractor, and subjected to a mechanical or flashing operation to separate said organic compound from the acid solution. The separated organic compound such as naphtha may then be recovered by conventional means. The boric acid-polyhydroxy organic compound solution may then be charged to another vessel wherein said solution is subjected to a steam stripping operation whereby the basic impurities are stripped from said solution, after which the latter may then be recycled to the extractor for further use as a portion of the absorbing solution.

The following example is given to illustrate the process of the invention which, however, is not intended to limit the generally broad scope of the present invention in strict accordance therewith.

*Example I*

A 100 cc. sample of thermally cracked naphtha containing 287 p. p. m. of basic nitrogen was placed in a separatory funnel at room temperature and atmospheric pressure. 100 cc. of a boric acid-glycerol solution containing a 4 to 1 molar ratio of glycerol to boric acid was added to the funnel after which the funnel was thoroughly agitated for a period of approximately 3 minutes. The naphtha was separated from the acid solution and subjected twice more to a similar extraction with similar quantities of boric acid-glycerol acid solution. At the end of this time the naphtha was analyzed colorimetrically for basic nitrogen and it was found that the treated naphtha contained only 2 p. p. m. of basic nitrogen.

I claim as my invention:

1. A process for the removal of nitrogen containing basic impurities from a hydrocarbon fraction containing the same which comprises treating said fraction with a solution comprising boric acid and a polyhydroxy organic compound, and recovering the purified hydrocarbon fraction.

2. A process for the removal of nitrogen containing basic impurities from a petroleum distillate containing the same which comprises treating said distillate with a solution comprising boric acid and a polyhydroxy organic compound, and recovering the purified hydrocarbon distillate.

3. A process for the removal of nitrogen containing basic impurities from naphtha containing the same which comprises treating said naphtha with a solution comprising boric acid and a polyhydroxy organic compound, and recovering the purified naphtha.

4. A process for the removal of nitrogen containing basic impurities from naphtha containing the same which comprises treating said naphtha with a solution comprising boric acid and a polyhydroxy aliphatic compound, and recovering the purified naphtha.

5. A process for the removal of nitrogen containing basic impurities from naphtha containing the same which comprises treating said naphtha with a solution comprising boric acid and a polyhydroxy aromatic compound, and recovering the purified naphtha.

6. A process for the removal of nitrogen containing basic impurities from naphtha containing the same which comprises treating said naphtha with a solution comprising boric acid and 1,2-dihydroxypropane, and recovering the purified naphtha.

7. A process for the removal of nitrogen containing basic impurities from naphtha containing the same which comprises treating said naphtha with an acid solution comprising boric acid and glycerol, and recovering the purified naphtha.

8. A process for the removal of nitrogen containing basic impurities from naphtha containing the same which comprises treating said naphtha with an acid solution comprising boric acid and pyrocatechin, and recovering the purified naphtha.

9. A process for the removal of nitrogen containing basic impurities from kerosene containing the same which comprises treating said kerosene with an acid solution comprising boric acid and glycerol, and recovering the purified kerosene.

10. A process for the removal of nitrogen containing basic impurities from gasoline containing the same which comprises treating said gasoline with an acid solution comprising boric acid and glycerol, and recovering the purified gasoline.

11. A process for the removal of nitrogen containing basic impurities from naphtha containing the same which comprises treating said naphtha with an acid solution comprising boric acid and glycerol, flashing off the naphtha from the acid solution, and recovering the purified naphtha.

12. A process for the removal of nitrogen containing basic impurities from kerosene containing the same which comprises treating said kerosene with an acid solution comprising boric acid and glycerol, flashing off the kerosene from the acid solution, and recovering the purified kerosene.

No references cited.